United States Patent
Sebesta et al.

(10) Patent No.: US 9,798,508 B2
(45) Date of Patent: Oct. 24, 2017

(54) IMPLEMENTING PREVIOUSLY RENDERED FRAME BUFFER INFORMATION IN A CUSTOMIZED GUI DISPLAY

(71) Applicant: Microsoft Technology Licensing, LLC, Redmond, WA (US)

(72) Inventors: David Jaroslav Sebesta, Woodinville, WA (US); Robert C. Elmer, Redmond, WA (US); Robert Wilhelm Schmieder, Snoqualmie, WA (US); Michael Thomas Gahrns, Woodinville, WA (US); Clark David Nicholson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 682 days.

(21) Appl. No.: 13/658,450

(22) Filed: Oct. 23, 2012

(65) Prior Publication Data
US 2014/0015842 A1    Jan. 16, 2014

Related U.S. Application Data

(60) Provisional application No. 61/672,230, filed on Jul. 16, 2012.

(51) Int. Cl.
G09G 5/36      (2006.01)
G09G 5/395    (2006.01)
G06F 3/14      (2006.01)

(52) U.S. Cl.
CPC .......... *G06F 3/1431* (2013.01); *G09G 5/363* (2013.01); *G09G 5/395* (2013.01); *G06F 3/1454* (2013.01); *G09G 2370/02* (2013.01)

(58) Field of Classification Search
None
See application file for complete search history.

(56) References Cited

U.S. PATENT DOCUMENTS

| 5,949,437 | A   | 9/1999  | Clark |
| 6,928,464 | B2* | 8/2005  | Appiah et al. ................ 709/204 |
| 7,439,937 | B2  | 10/2008 | Ben-Shachar et al. |

(Continued)

FOREIGN PATENT DOCUMENTS

| CN | 1758217   | 4/2006  |
| CN | 101872293 | 10/2010 |

OTHER PUBLICATIONS

U.S. Appl. No. 13/228,446, filed Sep. 9, 2011, Srinivas, et al.

(Continued)

*Primary Examiner* — Joni Richer
(74) *Attorney, Agent, or Firm* — Workman Nydegger

(57) ABSTRACT

Embodiments are directed to providing direct access to graphical user interface (GUI) frame buffers and to associating input hardware with a login session. In one scenario, a computer system registers a plug-in software module with a remote desktop client. The registering includes requesting one or more frame buffers rendered for display on a computer system display. The computer system determines that a session has been established between a computer system user and the remote desktop client. The computer system then receives the requested frame buffers and displays the frame buffers on the computer system display and/or sends the received frame buffers to various registered third parties.

20 Claims, 5 Drawing Sheets

(56) References Cited

U.S. PATENT DOCUMENTS

| | | | |
|---|---|---|---|
| 7,667,707 B1* | 2/2010 | Margulis | 345/519 |
| 7,950,046 B2* | 5/2011 | Kropivny | 726/3 |
| 8,106,909 B2 | 1/2012 | McDowell | |
| 8,134,568 B1 | 3/2012 | Iwamoto et al. | |
| 8,441,494 B2* | 5/2013 | Byford et al. | 345/545 |
| 2005/0243021 A1 | 11/2005 | Perez et al. | |
| 2007/0091118 A1* | 4/2007 | Allen et al. | 345/619 |
| 2007/0094413 A1* | 4/2007 | Salazar et al. | 709/248 |
| 2007/0143837 A1* | 6/2007 | Azeez et al. | 726/11 |
| 2007/0288640 A1 | 12/2007 | Schmieder | |
| 2008/0195620 A1* | 8/2008 | Abanami et al. | 707/9 |
| 2009/0248802 A1 | 10/2009 | Mahajan et al. | |
| 2010/0039496 A1* | 2/2010 | Kazemi et al. | 348/14.08 |
| 2010/0082733 A1* | 4/2010 | Bernstein et al. | 709/203 |
| 2010/0115125 A1 | 5/2010 | Peterson | |
| 2010/0199225 A1* | 8/2010 | Coleman et al. | 715/858 |
| 2010/0231599 A1 | 9/2010 | Tung et al. | |
| 2010/0306306 A1* | 12/2010 | Kamay | 709/203 |
| 2011/0202750 A1 | 8/2011 | Creasey | |
| 2011/0238381 A1* | 9/2011 | Edwards | 702/188 |
| 2011/0265172 A1* | 10/2011 | Sharma et al. | 726/8 |
| 2012/0011193 A1* | 1/2012 | Gilboa | 709/203 |
| 2012/0081383 A1 | 4/2012 | Reeves et al. | |
| 2012/0218292 A1* | 8/2012 | Nyczyk | G06F 3/1462 345/629 |
| 2012/0268650 A1* | 10/2012 | Song et al. | 348/441 |
| 2013/0155049 A1* | 6/2013 | Marsan | 345/419 |

OTHER PUBLICATIONS

Humphreys, et al., "WireGL: A Scalable Graphics System for Clusters", In Proceedings of SIGGRAPH, Aug. 2001, 12 pages.

"International Search Report & Written Opinion for PCT Patent Application No. PCT/US2013/049824", Mailed Date: Nov. 4, 2013, Filed Date: Jul. 10, 2013, 9 Pages.

Office Action cited in Chinese Patent Application No. 201380038065.9, mailed Oct. 9, 2016.

"Office Action Issued in Chinese Patent Application No. 201380038065.9", dated Jun. 15, 2017, 6 Pages.

* cited by examiner

IMPLEMENTING PREVIOUSLY RENDERED FRAME BUFFER INFORMATION IN A CUSTOMIZED GUI DISPLAY

CROSS-REFERENCE TO RELATED APPLICATIONS

This application claims priority to and the benefit of U.S. Provisional Application No. 61/672,230, entitled "IMPLEMENTING PREVIOUSLY RENDERED FRAME BUFFER INFORMATION IN A CUSTOMIZED GUI DISPLAY", which was filed on Jul. 16, 2012, and which is incorporated by reference in its entirety herein.

BACKGROUND

Computer graphical user interfaces are typically rendered using a physical Graphical Processing Unit (GPU), and then displayed on a monitor connected to the GPU via standard physical graphics interface cables such as DVI, VGA, DisplayPort, or HDMI. This typical configuration has certain limitations when attempting to create systems with larger numbers of monitors. For instance, typical personal computers (PCs) come with only one or two monitor ports. After-market graphics cards with more than two ports can be purchased for desktop PCs, but these cards are relatively expensive. Typical desktop PC motherboards have only one or two expansion slots for graphics cards, and configurations with more expansion slots require custom PCs which are expensive and complicated to assemble and maintain. Also, standard physical graphics cables have limited distances across which they will function.

Various technologies have been developed that allow users to connect monitors to computers over different interfaces, such as USB. These technologies generally involve manipulation of the video driver stack in order to present more monitors to the OS than are actually physically connected to the GPU. Such technologies can introduce poor reliability due to video filter drivers that are difficult to develop and highly susceptible to breaks resulting from changes in the GPU's driver.

BRIEF SUMMARY

Embodiments described herein are directed to providing direct access to graphical user interface (GUI) frame buffers and to associating input hardware with a login session. In one embodiment, a computer system registers a plug-in software module with a remote desktop client. The registering includes requesting one or more frame buffers rendered for display on a computer system display. The computer system determines that a session has been established between a computer system user and the remote desktop client. The computer system then receives the requested frame buffers and displays the frame buffers on the computer system display and/or sends the received frame buffers to various registered third parties.

In another embodiment, a computer system associates input hardware with a login session. The computer system determines which display devices are connected to the computer system and enumerates each display device that is connected to it. The computer system creates a custom session for each enumerated display device. Creation of the custom session comprises registering a plug-in software module with a remote desktop client running on the computer system, requesting one or more frame buffers rendered for display on at least one of the enumerated display devices, receiving the one or more requested frame buffers. The computer system then displays the frame buffers on the enumerated display device and/or sends the received frame buffers to various registered third parties.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
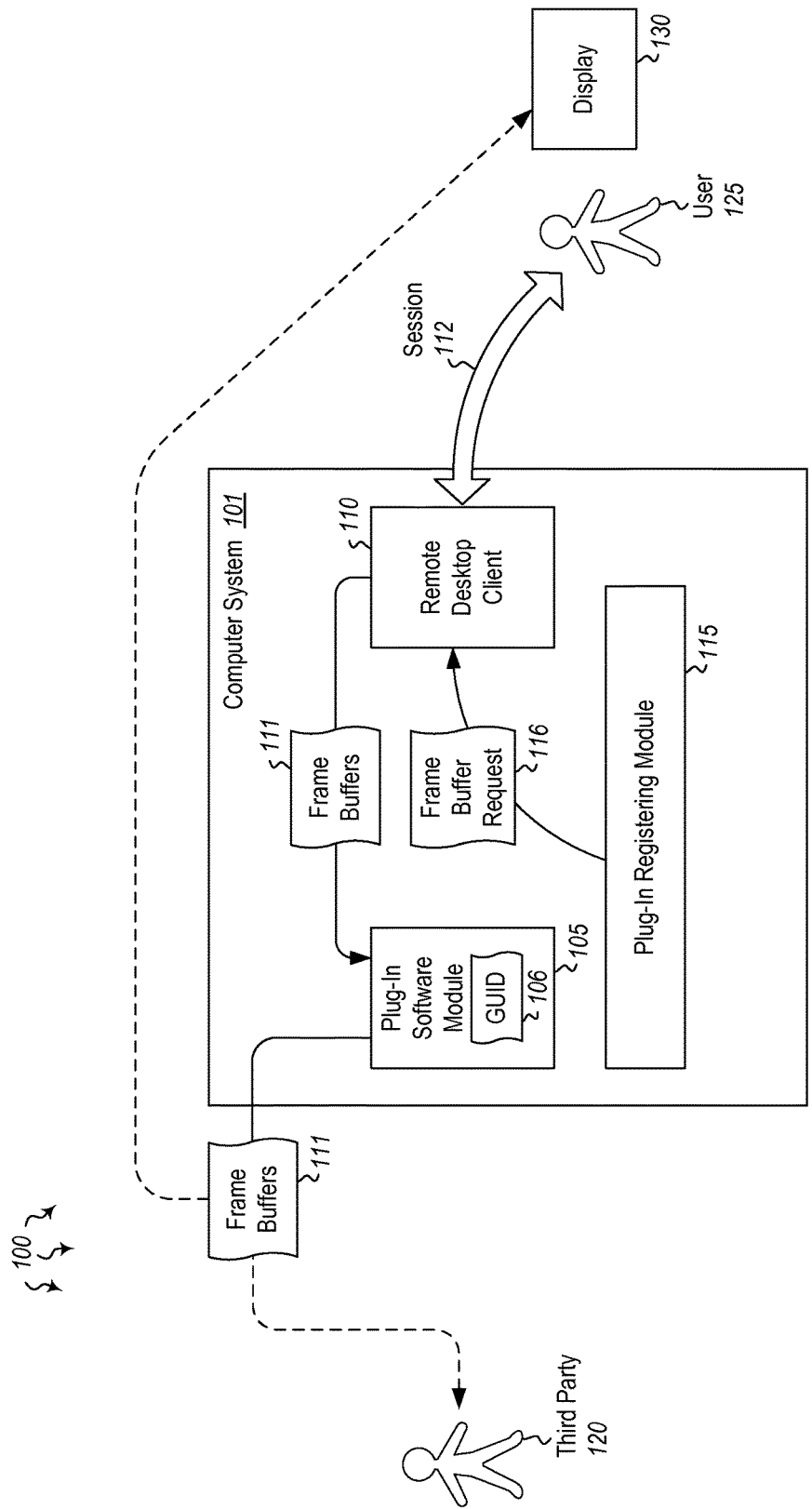
FIG. 1 illustrates a computer architecture in which embodiments described herein may operate including providing direct access to graphical user interface (GUI) frame buffers.

Embodiments described herein are directed to providing direct access to graphical user interface (GUI) frame buffers and to associating input hardware with a login session. In one embodiment, a computer system registers a plug-in software module with a remote desktop client. The registering includes requesting one or more frame buffers rendered for display on a computer system display. The computer system determines that a session has been established between a computer system user and the remote desktop client. The computer system then receives the requested frame buffers and displays the frame buffers on the computer system display and/or sends the received frame buffers to various registered third parties.

In another embodiment, a computer system associates input hardware with a login session. The computer system determines which display devices are connected to the computer system and enumerates each display device that is connected to it. The computer system creates a custom session for each enumerated display device. Creation of the custom session comprises registering a plug-in software module with a remote desktop client running on the computer system, requesting one or more frame buffers rendered for display on at least one of the enumerated display devices, receiving the one or more requested frame buffers. The computer system then displays the frame buffers on the enumerated display device and/or sends the received frame buffers to various registered third parties.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FP- GAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes computer system 101. Computer system 101 may be any type of local or distributed computer system, including a cloud computing system. The computer system includes various modules for performing a variety of different functions. For instance, computer system 101 includes a plug-in software module 105. The plug-in software module 105 is configured to intercept frame buffers 111 that are intended for a computer display (e.g. 130). The plug-in software module can perform processing on the frame buffer 111 including sending the frame buffer to a third party 120 or to a computer system user 125.

Figure 5:
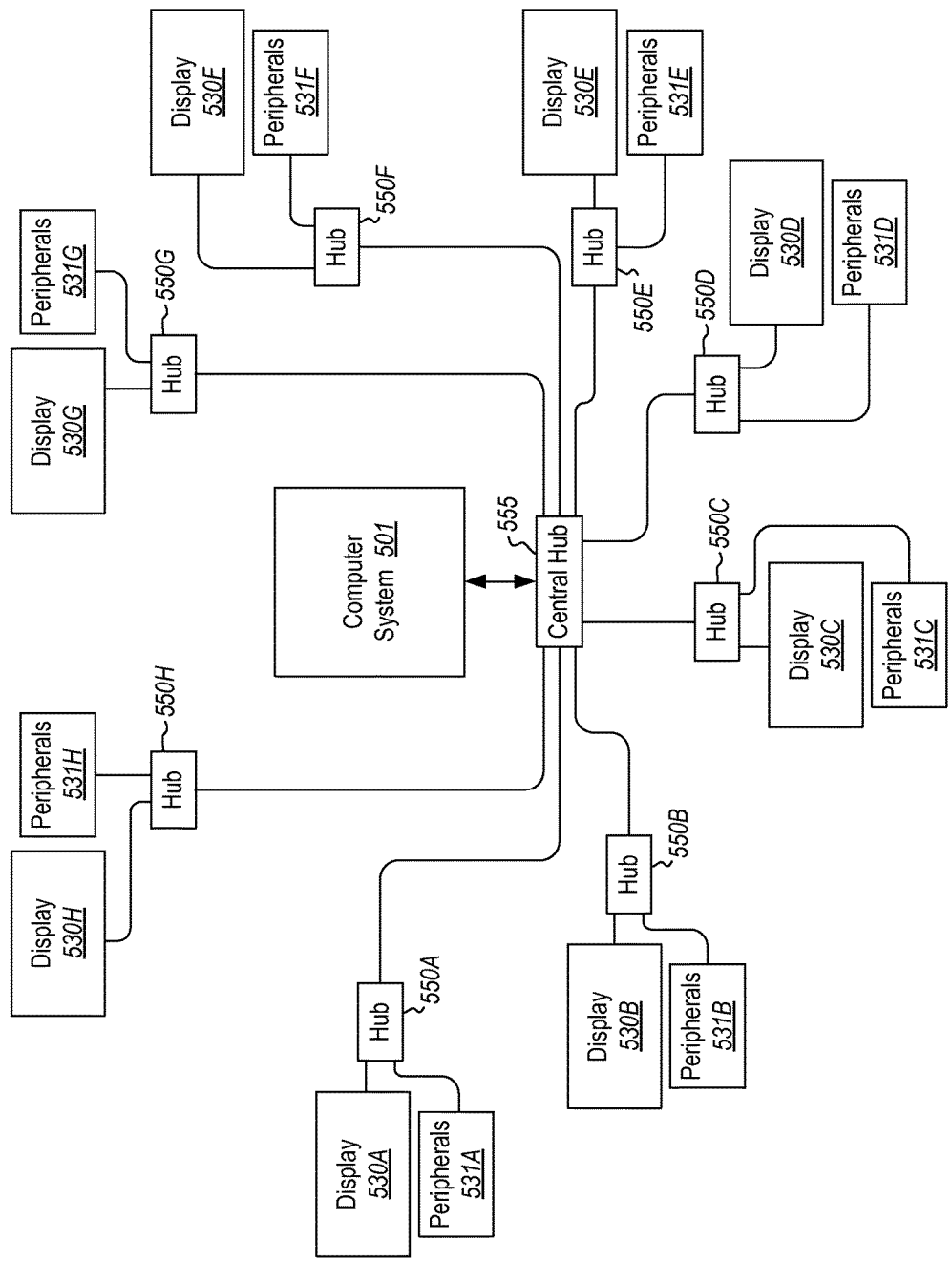
FIG. 5 illustrates an embodiment in which a single computer system is connected to a plurality of computer monitors using a USB hub.

The computer system user 125 may establish a remote desktop client session 112 with the computer system 101. The session 112 with the remote desktop client 110 allows user 125, along with a plurality of other users, to log in to the same computer system. For instance, as shown in FIG. 5, multiple different users at displays 530A-530H may log in to a remote desktop client to establish sessions with computer system 501. As such, users at each of the displays may have their own, customized desktop, their own display, their own mouse and access to documents or other files they have created (or otherwise have access to).

In many systems, computer graphical user interfaces (GUIs) are rendered using a physical graphical processing unit (GPU), and then displayed on a monitor connected to the GPU a via physical graphics interface cables such as digital visual interface (DVI), video graphics array (VGA), DisplayPort®, or high-definition multimedia interface (HDMI) cables. Personal computers (PCs) often come with only one or two monitor ports. After-market graphics cards with more than two ports can be purchased for desktop PCs, but are typically expensive.

One way to connect multiple monitors to a computer system is to use different interfaces, including universal serial bus (USB). Such implementations generally involve manipulation of the video driver stack in order to present more monitors to the operating system (OS) than are actually physically connected to the GPU. Such implementations can introduce poor reliability due to video filter drivers that are highly susceptible to breaks resulting from changes in the GPU's driver. Poor performance may also result, in such implementations, when reading back from the GPU's video memory (e.g. when multiple videos streams with cursor movement are being rendered through a single GPU). Still further, operating system graphical subsystems often have built-in limitations as to the number of displays that can be connected to a single GPU.

In multi-user embodiments described herein, where multiple users have established remote desktop connections to virtualized desktops, the graphical UI for each desktop has already been rendered into a frame buffer 111 by the time it reaches the remote desktop client 110. Consequently, there is no need for the remote desktop client 110 to utilize a GPU. As described herein, embodiments provide a software interface that allows third parties (e.g. 120) to gain access to the graphical UI frame buffers 111 directly. These frame buffers can then be processed, transmitted and displayed directly on a monitor (e.g. display 130), without using a GPU. Embodiments described herein also allow for the use of a hardware mouse cursor for each monitor, bypassing any potential underlying OS limitations of a single hardware mouse cursor for all monitors.

As shown in FIG. 5, a central computer system 501 may be attached to one or more local user stations (530A-530H). Each of these local user stations may include at least one monitor to display an operating system desktop, a keyboard, and a mouse for user input. The local user stations may be created using physical monitors connected to the central computer system 501 via a central hub 555 (such as a USB hub or other connecting device) and enumerating those physical displays as display devices in the operating system. Additional types of local user stations may also be used. Such local user stations may be referred to herein as "custom presenter stations". These custom presenter stations may be created using a display device connected through, for example, a multi-function USB hub 550.

A user or installer may connect custom presenter stations to the central computer system 501 using a direct video connected station and multiple multi-function USB hubs (e.g. 550A-550H). The multi-function hubs may include a video port and device ports for keyboard and mouse (e.g. peripherals 531A-531H). The installer connects and maps the direct video connected station, and then installs the custom presenter plug-in (e.g. plug-in software module 105) for the multi-function hubs. The installer connects the multi-function hubs to the central computer system (either directly, or through a central hub 555), and when the computer system reboots (or restarts the above-mentioned functionality), all the stations with the multi-function hubs are automatically mapped into stations and display the desktop logon screen (or other image).

The central computer system 501 may be configured to iterate through the USB hubs connected to the computer (e.g. hubs 550A-550H) and call a specified plug-in for each hub. The plug-in examines the specified USB hub to determine if the plug-in recognizes the hub as a custom station presenter hub or not. If it does not, the station is not implemented as a custom presented station. If the plug-in does recognize the hub, a pointer is returned, identifying the address of a custom presenter station.

Figure 4:
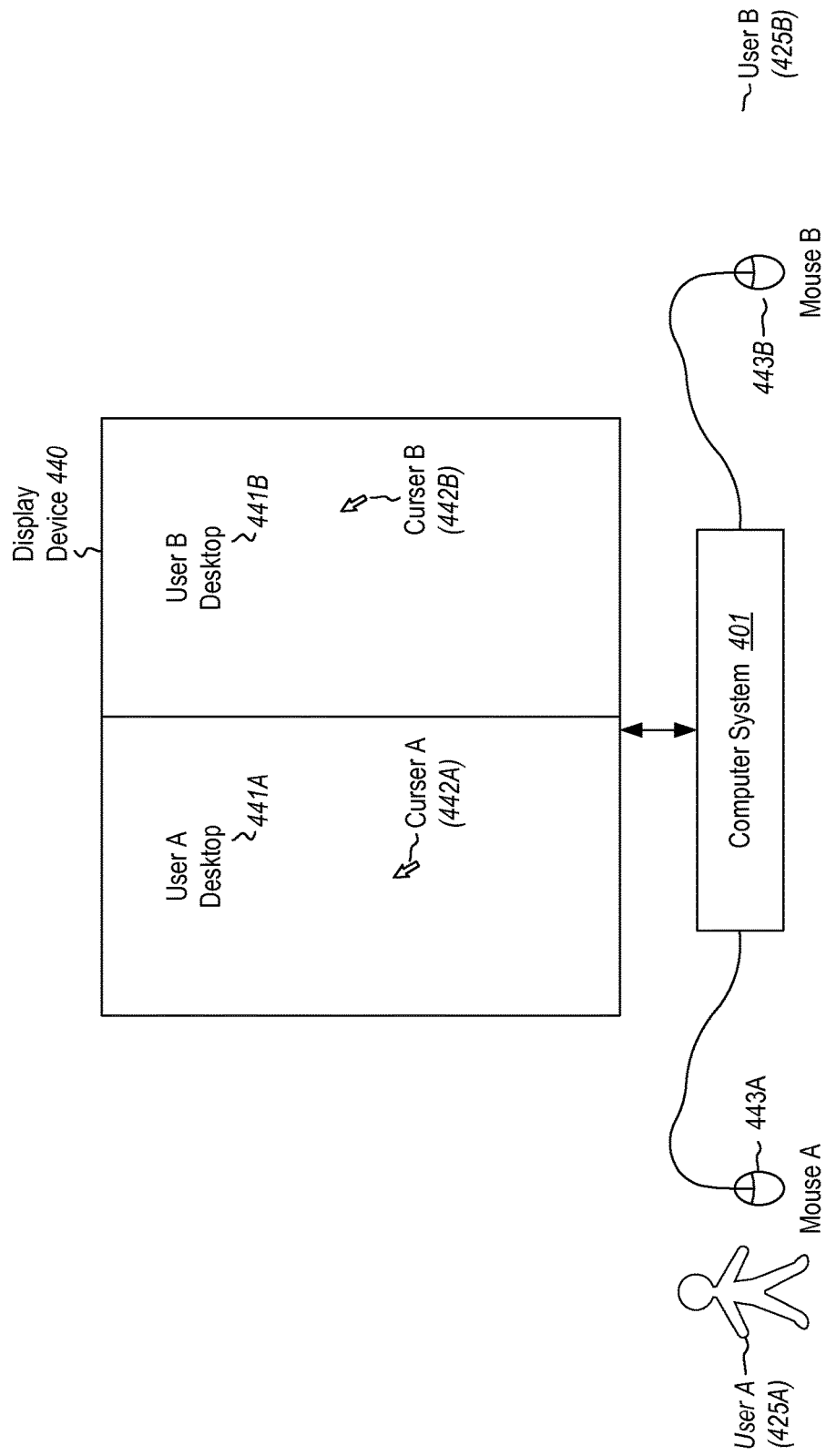
FIG. 4 illustrates an embodiment in which two users share a computer monitor, each with their own computer desktop.

In some cases, an interface may be used by the central computer system 101/501 to retrieve a unique identifier from a custom presenter station, get the dimensions of the device, and divide the presentation device into one or more stations (as shown in FIG. 4). A method may be used by the central computer system to retrieve a system-wide unique and persistent ID for the custom presenter station device (an "Instance ID", e.g. globally unique identifier (GUID) 106). The Instance ID may be saved by the central computer system in a persistent storage area so that it can re-create the same station each time the system restarts. Other methods may be used to perform various tasks such as requesting the size, in pixels, of the custom presentation device's screen area, subdividing the custom presenter station into one or more regions, where each region represents the desktop for a station, retrieving the dimensions of a station presenter to get a custom mouse presenter interface for a station presenter, and providing frame buffers for the station presenter.

A custom mouse presenter interface may be used to update a station's screen with the movements of a mouse pointer. The custom mouse presenter interface may access the frame buffer 111 and use information including the size of the frame buffer, the color depth, and the region that has been modified from the previous frame buffer to determine where to display the mouse. As the user of a local user station moves the mouse cursor around on the station's desktop, the mouse cursor may change to different shapes, depending on the UI element the cursor is covering. As these cursor changes occur, the central computer system may change the shape of the cursor for that station. For example, as the user of a local user station moves the mouse cursor around on the station's desktop, the mouse cursor may be changed from being visible to invisible to the user, depending on the UI element the cursor is covering or being covered by.

Resolution and orientation changes to a custom presenter station can be made by third parties. The third party (such as an independent hardware vendor) may provide a software application configured to change the resolution and/or orientation. The application may be run to set the resolution and/or orientation. After the resolution and/or orientation are set, the central computer system 501 may be restarted so that the custom presenter station that was changed will report the newly set resolution.

The design of the custom presenter plug-in interface 105 allows multiple implementations on the same central computer system 101/501. Implementations of the custom presentation plug-in interface and the associated custom presenter stations (530A-530H) can co-exist on the same central computer system with manually mapped direct video connect stations and interfaces for custom presenter stations from different manufacturers. This can occur because the each implementation of the interface supports specific USB hubs, manufactured by the implementer of the plug-in interface. Unclaimed USB hubs are available to be manually mapped to direct video connected stations. These concepts will be explained further below with regard to methods 200 and 300 of FIGS. 2 and 3, respectively.

Figure 2:
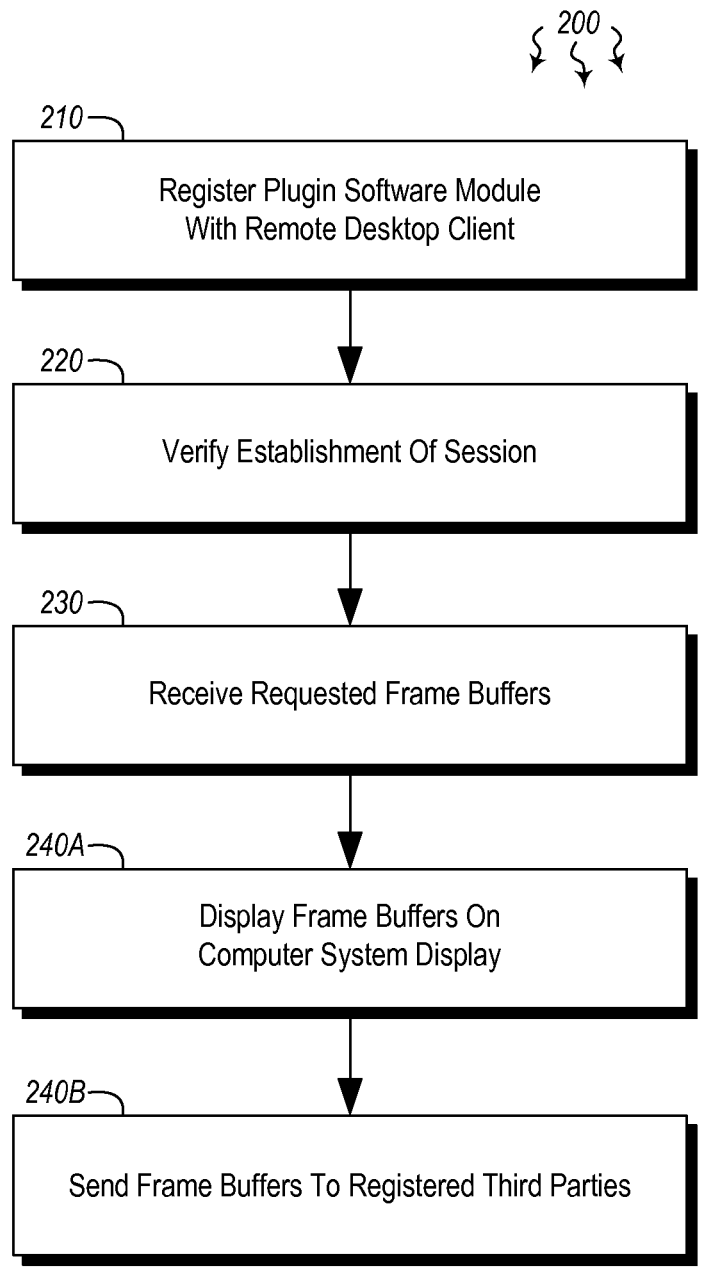
FIG. 2 illustrates a flowchart of an example method for providing direct access to graphical user interface (GUI) frame buffers.
Figure 3:
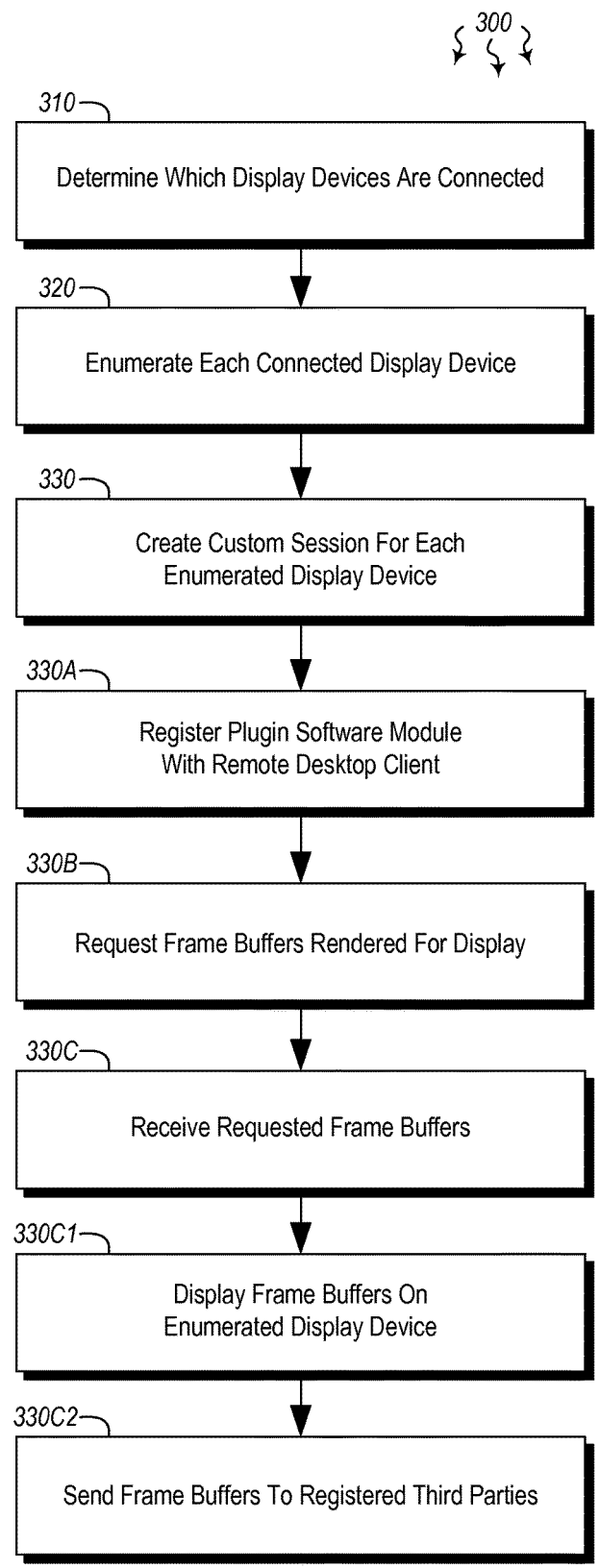
FIG. 3 illustrates a flowchart of an example method for associating input hardware with a login session.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing direct access to graphical user interface (GUI) frame buffers. The method 200 will now be described with frequent reference to the components and data of environment 100.

Method 200 includes an act of registering a plug-in software module with a remote desktop client, wherein the registering includes requesting one or more frame buffers rendered for display on a computer system display (act 210). For example, plug-in registering module 115 may register plug-in software module 105 with remote desktop client 110. The registering includes sending a frame buffer request 116 to the remote desktop client 110 requesting frame buffers 111 that have b been rendered for display on a computer monitor such as user 125's display (130). The registered plug-in software module may include a unique, persistent identifier such as GUID 106. Each manufacturer of a custom presenter station may have their own interface and their own way of processing and presenting frame buffers. Accordingly, each manufacturer may register their plug-in with the remote desktop client 110 of computer system 101.

Each registered plug-in module may define its own display dimensions. Accordingly, some manufacturers may indicate display dimensions for their monitors. These display dimensions may be used by the plug-in software module 105 that is specific to that manufacturer. The display dimensions include the number of pixels of the custom presentation device's screen area, or simply the screen area. The plug-in software module may also provide other information regarding the custom presenter station including the size of the frame buffer, color depth information for the frame buffer, a modified region that identifies a region of the frame buffer that has changed since the previous frame buffer or other information. This additional data may be provided as a part of or in addition to the frame buffers 111.

Method 200 further includes an act of determining that a session has been established between a computer system user and the remote desktop client (act 220). The computer system 101 may determine that a session 112 has been established between user 125 and the remote desktop client 110. The remote desktop session may be running on computer system 101 (a local computer) or on a remote computer system. Thus, the term "remote desktop client" refers to an application that establishes a desktop session with a user, regardless of whether the computer system is actually remote to the user or not. The session verifies the user's identity, authenticates the user and establishes a virtualized desktop (i.e. a remote desktop) for the user. The remote desktop provides a user with their own desktop, with their own chosen background, icons, applications and other settings. The user has access to files they have created or otherwise have rights to. In this manner, once the user logs off, another user can log on to the same computer system, establish a session, and have their own desktop, which is different from any other users' desktop. Moreover, as described below, the computer system 101 can establish sessions 112 with multiple different users simultaneously, providing custom desktops to each user.

Method 200 next includes an act of receiving the one or more requested frame buffers (act 230). Thus, in response to frame buffer request 116, the remote desktop client 110 may send frame buffers 111 to the plug-in software module. The frame buffers may then be sent to display 130 where they can be displayed for the user (act 240A) or they can be sent to a third party 120 (act 240B) for processing by the third party. The third party may display the frame buffers on a separate display or perform other types of processing on them. By sending the frame buffers to a third party or to a display (130), the software plug-in module 105 may send monitor-specific frame buffers that have been processed in a manner specified by the plug-in's creator.

In some embodiments, as shown in FIG. 4, the registered plug-in software module 105 may be subdivided into one or more regions. Each region represents a desktop for a local user station. Thus, display device 440 may show two user desktops (441A and 441B) on the same screen. Each desktop has its own session (e.g. 112), and its own custom presenter. The plug-in software module tells the computer system 401 and the display device 440 where to divide the screen, and where each session should be displayed. Each session has its own mouse cursor (442A for desktop 441A, and 442B for desktop 441B), controlled by user 425A and mouse 443A, and user 425B and mouse 443B, respectively. Accordingly, two users may sit at the same monitor and view separate desktops, with separate files, separate backgrounds and separate peripherals (i.e. mice and keyboards). The mouse cursors may be hardware-generated mouse cursors, software-generated mouse cursors or a combination of the two. The mouse cursor may be changed from being visible to the user (e.g. 425A) to invisible as the user moves the mouse cursor, depending on which UI element the cursor is covering or being covered by.

In situations where multiple monitors or custom presenter stations (including peripherals) are connected to the central computer system 101/501, the different user stations may be associated with multi-function hubs including USB hubs. When custom presenter stations are associated with a USB hub (as display 530A and peripherals 531A are connected to hub 550A), the display will receive an instance ID. The instance ID may be used to maintain a mapping between one or more computer system displays and hub. Similar IDs may be used with peripherals. As such, the mapping between displays and hubs does not need to be re-performed at each reboot. The central computer system also determines, for each USB device, whether the USB device is to be associated with a plug-in software module. If so, the USB device (e.g. mouse 443A of FIG. 4) is associated with the plug-in software module and provided an instance ID. In this manner, many different displays and peripherals may be connected to a central computer system, and many different users may log in and create desktop sessions using a single computer system.

FIG. 3 illustrates a flowchart of a method 300 for associating input hardware with a login session. The method 300 will now be described with frequent reference to the components and data of environments 100 and 500 of FIGS. 1 and 5, respectively.

Method 300 includes an act of determining which display devices are connected to the computer system (act 310). For example, computer system 501 may determine which hubs (e.g. 550A-550H) and/or which display devices (530A-530H) are connected to it, either directly, or through a central hub 555. Each connected display device is then enumerated (act 320). Enumerating the display devices may include defining a device class and searching for devices in that class. For example, the device class may include all displays greater than 24", or all displays made by a specified manufacturer, or all displays that have HDMI ports, or some other characteristic or grouping. Enumerating may also include specifying each device's globally unique identifier (GUID).

Method 300 then includes an act of creating a custom session for each enumerated display device (act 330). Creating a custom session includes an act of registering a plug-in software module with a remote desktop client running on the computer system (act 330A) (i.e. registering plug-in software module 105 with remote desktop client 110), an act of requesting one or more frame buffers rendered for display on at least one of the enumerated display devices (act 330B) and an act of receiving the one or more requested frame buffers (act 330C). Thus, frame buffer request 116 may be sent from plug-in registering module 115 to the remote desktop client, which sends the frame buffers 111 in response. The frame buffers may also include mouse data that itself includes cursor shape and cursor position information.

Method 300 next includes an act of displaying the frame buffers on the enumerated display device (act 330C1) and/or an act of sending the received frame buffers to one or more registered third parties (act 330C2). The frame buffers may thus be displayed by display 130 and/or transferred to third party 120. The third party may process the frame buffers in any number of ways including compressing the frame buffer and transferring it to another computer system or computer system display.

In some embodiments, displaying the frame buffers on the display device may include detecting which regions of the screen are playing a video and initiating a separate data stream for that data. For instance, if a user is watching a h.264-encoded video, the plug-in software module could be notified that two different data streams will be coming in, and should be processed different—one data stream for the h.264 video and one for the remainder of the desktop. This h.264 video stream may be decoded using computer system hardware. In this manner, video streams may be separated from normal content, and may be provided with hardware decoding or other features that improve the end-user experience.

Accordingly, methods, systems and computer program products are provided which provide direct access to graphical user interface (GUI) frame buffers. Moreover, methods, systems and computer program products are provided which associate input hardware with a login session, and allow multiple users to conduct remote desktop sessions simultaneously.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system for providing direct access to graphical user interface (GUI) frame buffers to a plurality of displays such that the frame buffers can be displayed upon the displays, the system comprising:
one or more processors;
one or more computer-readable storage media having stored thereon computer-executable instructions that, when executed by the one or more processors, causes the computing system to perform the following:
registering a plug-in software module with a remote desktop client of the computer system, the plug-in software module configured to receive frame buffers generated on the computer system and intended for display on a remote display device and wherein registering the plug-in software module includes requesting one or more frame buffers rendered for display;
determining that a session has been established between a plurality of computer system users and the remote desktop client, each user having its own remote display device;
the plug-in software module receiving one or more requested frame buffers from the remote desktop client for each of the users, each of the one or more requested frame buffers being completely generated on the computer system prior to transmitting to a user for display; and displaying at least one frame buffer previously generated on the computer system on the remote display device of each of the plurality of users, wherein the at least one frame buffer was completely generated on the computer system prior to transmitting and wherein the at least one frame buffer can be displayed without additional calculation or manipulation on the remote display device.

2. The computer system of claim 1, wherein a registered third party receives frame buffers and displays the frame buffers on a separate computer system display.

3. The computer system of claim 1, wherein the registered plug-in software module includes a unique, persistent identifier.

4. The computer system of claim 1, further comprising defining display dimensions for the registered plug-in software module, wherein the display dimensions comprise the number of pixels of the custom presentation device's screen area.

5. The computer system of claim 1, further comprising subdividing the registered plug-in software module into one or more regions, wherein each region represents a desktop for a local user station.

6. The computer system of claim 5, further comprising presenting each of the subdivided regions on the computer system display.

7. The computer system of claim 6, further comprising rendering a mouse cursor on each of the subdivided regions, such that each local user desktop has its own mouse cursor.

8. The computer system of claim 7, wherein at least one of the mouse cursors comprises a hardware mouse cursor.

9. The computer system of claim 7, wherein at least one of the mouse cursors comprises a software mouse cursor.

10. The computer system of claim 1, wherein the frame buffer includes one or more portions of additional information including at least one of the following: the size of the frame buffer, color depth information for the frame buffer, and a modified region that identifies a region of the frame buffer that has changed since the previous frame buffer.

11. The computer system of claim 1, wherein a mouse cursor is changed from being visible to the computer system user to invisible as the user moves the mouse cursor, depending on which UI element the cursor is covering or being covered by.

12. The computer system of claim 1, further comprising associating a universal serial bus (USB) hub with the computer system display, wherein the computer system display receives an instance ID.

13. The computer system of claim 12, wherein the instance ID is used to maintain a mapping between one or more computer system displays and hub.

14. The computer system of claim 13, wherein the computer system determines, for each USB device, whether the USB device is to be associated with a plug-in software module.

15. A computer system for associating input hardware with a login session and for providing direct access to graphical user interface (GUI) frame buffers to a plurality of displays such that the frame buffers can be displayed upon the displays, the system comprising:
one or more processors;
system memory;
one or more computer-readable storage media having stored thereon computer-executable instructions that, when executed by the one or more processors, causes the computing system to perform:
determining that a plurality of display devices are connected to the computer system;
enumerating each display device that is connected to the computer system;
creating a custom session for each enumerated display device, wherein creating a custom session comprises:
registering a plug-in software module with a remote desktop client running on the computer system, the plug-in software module configured to receive frame buffers generated on the computer system and intended for display on the each display device;
requesting one or more frame buffers rendered for display on at least one of the enumerated display devices, wherein each of the one or more requested frame buffers are completely generated on the computer system prior to transmitting for display on the at least one of the enumerated display devices;
associating input hardware for the each enumerated display device with the custom session;
the plug-in software module receiving the one or more requested frame buffers from the remote desktop client; and
displaying at least one frame buffer previously generated on the computer system on the each enumerated display device without directly accessing a GPU on the each enumerated display device, wherein the at least one frame buffer was completely generated on the computer system prior to transmitting and wherein the at least one frame buffer can be displayed without additional calculation or manipulation on the each enumerated display device.

16. The computer system of claim 15, wherein the input hardware is a mouse and further comprising including mouse data along with the frame buffers, wherein the mouse data includes cursor shape and cursor position.

17. The computer system of claim 15, wherein enumerating each display device comprises defining a device class and searching for devices in that class.

18. The computer system of claim 15, wherein enumerating each display comprises specifying each device's globally unique identifier (GUID).

19. The computer system of claim 15, wherein a frame buffer is compressed and transferred to another device.

20. A computer system for providing direct access to graphical user interface (GUI) frame buffers to a plurality of displays such that the frame buffers can be displayed upon the displays, the system comprising:
one or more processors;
system memory;
one or more computer-readable storage media having stored thereon computer-executable instructions that, when executed by the one or more processors, causes the computing system to perform:
registering a plug-in software module with a remote desktop client of the computer system, the plug-in software module configured to receive frame buffers generated on the computer system and intended for display on a display device and wherein registering the plug-in software module includes requesting one or more frame buffers rendered for display;

determining that a session has been established between a plurality of computer system users and the remote desktop client;

the plug-in software module receiving one or more requested frame buffers from the remote desktop client for each of the users, each of the one or more requested frame buffers being generated on the computer system prior to transmitting to a user for display;

subdividing the registered plug-in software module into one or more regions, wherein each region represents a desktop for a local user station for each of the plurality of computer system users; and displaying the frame buffers previously generated on the computer system on each of the local user stations without directly accessing a GPU on the local user stations, wherein the frame buffers were completely generated on the computer system and wherein the frame buffers can be displayed without additional calculation or manipulation on the each of the local user stations.

\* \* \* \* \*